United States Patent
Dent

(10) Patent No.: US 7,968,838 B2
(45) Date of Patent: Jun. 28, 2011

(54) APPARATUS AND PROCESS FOR GENERATING A NEUTRON BEAM

(75) Inventor: William V. Dent, Hampton Cove, AL (US)

(73) Assignee: Dent International Research, Inc., Hampton Cove, AL (US)

( * ) Notice: Subject to any disclaimer, the term of this patent is extended or adjusted under 35 U.S.C. 154(b) by 351 days.

(21) Appl. No.: 12/253,166

(22) Filed: Oct. 16, 2008

(65) Prior Publication Data

US 2009/0095895 A1   Apr. 16, 2009

Related U.S. Application Data

(60) Provisional application No. 60/999,044, filed on Oct. 16, 2007.

(51) Int. Cl.
*H05H 3/02* (2006.01)

(52) U.S. Cl. ............ 250/251; 376/107; 376/144

(58) Field of Classification Search .......... 250/251
See application file for complete search history.

(56) References Cited

U.S. PATENT DOCUMENTS

| 4,390,494 | A | * | 6/1983 | Salisbury | 376/107 |
| 4,724,117 | A | * | 2/1988 | Stearns et al. | 376/129 |
| 4,830,813 | A | * | 5/1989 | Dance | 376/110 |
| 6,922,455 | B2 | * | 7/2005 | Jurczyk et al. | 376/144 |

OTHER PUBLICATIONS

Vourvopoulos, G., Dep, L., Paschal, J., and Spichiger, G.; "PELAN—A Transportable, Neutron-Based UXO Identification Technique", Department of Physics and Astronomy, Western Kentucy University, Bowling Green, Kentucky (1993).
Womble, P., Paschal, J., Cantrell, K. Belbot, M., and Hopper, L. "Evaluation of UXO Discrimination Using PELAN", Applied Physics Institute, Western Kentucky Univ., Bowling Green, Kentucky (2004).
Womble, P. C., Vourvopoulos, G., Paschal, J., Novikov, I., and Gongyin, C., "Optimizing the Signal to Noise Ratio for the PELAN System", Nuclear Instruments and Methods in Physics Research Section A: Accelerators, Spectrometers, Detectors and Associated Equipment, 505 (1), p. 470-473, Jun. 2003.
Chichester, D.L. and Simpson, J.D., "Compact Accelerator Neutron Generators", The Industrial Physicist, p. 22-25, American Institute of Physics, (Dec. 2003-Jan. 2004).
Bulten, H.J., Zhou, Z.L., Van Den Brand, J.F.J., Ferro-Luzzi, M., and Lang, J., Spin-exchange effects on tensor polarization of deuterium atoms, Physical Review A, vol. 58, No. 2, pp. 1146-1151 (1998).
Coulter, K.P., et al, "Spin-Exchange Optical Pumping as a Source of Spin-Polarized Atomic Deuterium", Physical Review Letters, vol. 68, No. 2, pp. 174-177 (Jan. 13, 1992).
Kinsho, M. et al, "Production of polarized negative deuterium ion beam with dual optical pumping", Review of Scientific Instruments, 67 (3), pp. 1362-1364, Mar. 1996.
Von Przewoski, B. et al, "Spin exchange in polarized deuterium", Physical Review A 68, 042705, pp. 1-4, (2003).
Seeley, J., Crawford, C., Clasie, B., Xu, W., Dutta, D., and Gao, H., "Laser-driven nuclear-polarized hydrogen internal gas target", Physical Review A73, 062714 pp. 1-14 (2006).
Price, J.S., Haeberli, W., "Polarization measurement for polarized gas targets", Nuclear Instruments and Methods in Physics Research A326 (1993) pp. 416-423.

* cited by examiner

Primary Examiner — Phillip A Johnston
(74) Attorney, Agent, or Firm — Mark Clodfelter

(57) ABSTRACT

A process is disclosed for generating particles with a high degree of anisotropy in the direction of emission.

9 Claims, 3 Drawing Sheets

APPARATUS AND PROCESS FOR GENERATING A NEUTRON BEAM

CROSS REFERENCE TO RELATED APPLICATIONS

This application claims priority from U.S. provisional application No. 60/999,044, filed Oct. 16, 2007, and which is incorporated herein in its entirety by reference.

FIELD OF THE INVENTION

This invention relates to particle beams, and particularly to apparatus and a process for producing a neutron beam.

BACKGROUND OF THE INVENTION

As is well known, an atom of any element is made up of a nucleus, with an electron cloud surrounding the nucleus. Electrons of the electron cloud carry a net negative charge, and the nucleus carries a net positive charge. The nucleus is further made up of nucleons; i.e. protons having a positive charge and neutrons having a no charge. In the nucleus, the protons and neutrons are attracted together by the strong force, which overcomes the electromagnetic repulsion between the positively charged protons. While sufficiently strong so as to attract protons and neutrons tightly into a nucleus, the strong force is only effective over a very small distance, on the order of 1 or 2 nucleon diameters. This limits the maximum size a nucleus can attain; lead 208 is the largest known stable nucleus having 208 neutrons and protons. Atomic nuclei containing more than 208 neutrons and protons are generally unstable, and decompose by shedding neutrons, protons and "quantums" of binding energy, typically gamma photons, representative of forces that temporarily held the released protons and neutrons to the unstable nucleus.

Other ways a nucleus can become unstable is for one or more extra nucleons to be introduced into the nucleus, creating an unstable nucleus. For example, it is well known that any combination of 5 nucleons is extremely unstable, and such a nucleus will rapidly decompose into one or more stable nuclei of stable configurations by the emission of one or more nucleons and energy. Of particular interest is the reaction of two isotopes of hydrogen, deuterium and tritium. Deuterium is a hydrogen atom, which typically has a single proton as the nucleus, and to which a neutron is added. This nucleus is called a deuteron. Tritium is a hydrogen atom to which two neutrons are added (called a triton). While these two atoms naturally repel each other due to electromagnetic repulsion of the protons, when brought close enough together, as by accelerating one nucleus into the other, the strong force becomes effective to cause the two nuclei to temporarily fuse together into a compound nucleus before decomposing. The decomposition or decay reaction may be symbolized as:

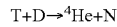

Meaning that the unstable nucleus formed by a deuteron and triton decomposes into a helium 4 ion and a neutron having an energy of about 14.1 MeV (mega electron volts). The binding energy of the unstable nucleus is released as a gamma ray photon. Similar reactions takes place when two deuterons are combined, this reaction is

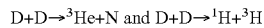

Meaning that a helium 3 ion and a neutron having an energy potential of about 2.5 MeV are produced, along with the corresponding gamma ray.

Conventional neutron generators of the prior art relevant to this invention may typically use a tritiated target, or in some instances a deuteriated target. Such a target may take the form of a metal hydride imbedded or containing tritium or deuterium. A small supply of deuterium gas provides a gas feed that is fed at a very low rate first through an ionizing electrical field to ionize individual atoms of deuterium (stripping off one or more electrons from the nucleus), creating deuterons that have a net positive charge. After being ionized, the positively charged deuterons may then be focused and accelerated to an energy of about 100-110 KeV using electrostatic fields into a beam of ions that is directed at the tritiated or deuterated target. 100-110 KeV is an energy level that maximizes a probability that a deuteron will fuse with a tritium nucleus. When deuterium is accelerated into deuterium, a somewhat higher accelerating voltage (110-150 KeV) is required to maximize the neutron output. In the target, the high energy deuterons undergo collisions with the target deuterium or tritium atoms and fuse therewith to temporarily create an unstable compound nucleus that immediately decays as described above. Neutrons that are produced by DT or DD collisions are emitted isotropically, that is, the neutrons are emitted equally in all directions, with no preference to the direction of emission. As neutrons have no charge, they cannot be controlled in the same manner as electrons and other charged particles. Neutrons produced in such a manner may then be used to irradiate elements of the subject under scrutiny and cause radioactive activation of these elements. For purposes where deep penetration by the neutrons is desirable, neutron generators using DT reactions producing relatively high energy neutrons is preferential, while in applications such as materials or nondestructive analysis, neutron generators using DD reactions that produce lower energy neutrons may be used.

In the neutron activation analysis technique currently in use, and as noted, an isotropic neutron source is brought within close proximity to a subject or sample to be analyzed to determine its elemental composition. Such proximity typically is on the order of a few inches to at most, a few feet. The relatively small number of neutrons that happen to irradiate target atomic nuclei cause emission of a unique spectrum, or signature, of gamma rays for each element. In this method, measurements are made of gamma rays that are either emitted almost instantaneously (prompt gamma-rays), or gamma rays that are delayed. Prompt gamma-rays are emitted essentially instantaneously from inelastic scattering, and are emitted from a compound nucleus formed when a neutron is captured by a target nucleus in the sample. Delayed gamma rays, on the other hand, are emitted by radioactive decay of one or more unstable intermediate nuclear states formed when an elemental atomic nucleus captures one or more incident neutrons. Analysis of the composite emitted gamma ray spectrum from these events allows a precise determination of the elemental content of the sample.

Where interest lies in detecting explosives, the presence of explosive compounds may be reliably detected utilizing the technique of irradiating the explosive with neutrons and observing the gamma rays produced by inelastic scattering, thermal neutron capture, and neutron activation. As the vast majority of explosives contain high concentrations of carbon, nitrogen and oxygen, strong gamma ray signatures of these elements together due to irradiation by neutrons may be taken as an indication of the presence of explosives. This technique of identifying elements by their gamma ray signature has been researched and well-developed for more than ten years (Ref. 1, 2). However, this technique has a serious drawback that limits the effective range at which the explosives can be detected (Ref. 3).

Neutron-based explosive detection systems of the prior art have used accelerator-based neutron sources, radioisotopes, or nuclear reactors (Ref. 4). These systems all suffer from the same problem in that they generate their neutrons isotropically, that is, there is no preferred direction in which the neutrons are generated. The neutron flux is equal in all directions. Thus, the vast majority of neutrons travel in directions other than toward the target and strike, among other elements, carbon, oxygen, nitrogen, and hydrogen atoms in the surrounding environment, creating large amounts of background noise. This noise limits the detection range for currently developed systems to between a few inches and a few feet, depending on the quantity of explosive being observed. As should be apparent, the need for locating or orienting the neutron source so close to the explosives is to put a sufficient number of neutrons into the explosives to cause a gamma ray signature of the explosive to stand out from the background noise.

Current accelerator-based neutron generators produce their neutrons isotropically because at the moment of fusion of the deuterium and tritium nuclei, the spins of the nuclei are randomly oriented. Research performed in the early 1960's demonstrated that the angular distribution of fission fragments emitted by neutron induced nuclear fission is not a random isotropic distribution, but rather is completely determined by the initial conditions of neutron and nuclei spins coupled with the total angular momentum.

The same principles of conservation of spin, angular, and linear momentum may be applied to the fusion of deuterium and tritium nuclei and the corresponding angular distribution of the neutrons and alpha particles resulting from the fusion reaction. A paper (Ref 5) entitled "SPIN-POLARIZED COLLISION OF DEUTERIUM AND TRITIUM: RELATIVISTIC KINEMATICS", by Thomas B. Bahder and William C. McCorkle., crediting William V. Dent, Jr. (Applicant) and dated Apr. 17, 2008, published by the Charles M. Bowden Research Facility, Weapons Sciences Directorate, Army Aviation and Missile Research, Development and Engineering Center at Redstone Arsenal in Huntsville, Ala., this paper being incorporated in its entirety by reference herein, examines the conservation of four momentum and conservation of intrinsic spin were considered in the context of special relatively. The deuterium nucleus, with a spin magnitude of 1, is oriented in an up direction, while the tritium nucleus, with a spin magnitude of ½, is oriented in a down direction at the moment of fusion. For a deuterium nucleus of energy 107 keV, the energy for maximum cross section for fusion and striking a stationary tritium nucleus, two solutions arise with the resulting emission of neutrons at plus and minus 82.85 degrees from the incident beam axis. In other words, if the nuclear spins of both the deuterium and tritium nuclei are aligned at the moment of fusion, the coupling of the spin, angular, and linear momentums should cause neutrons to be emitted in a pair of relatively tight beams, one beam being +82.85 degrees with respect to the deuterium ion beam, and the other beam being −82.85 degrees with respect to the deuterium ion beam. A pair of corresponding alpha particle beams are emitted in an opposite direction with respect to the neutron beams. While the incorporated paper ends with a conclusion that non-zero impact parameters will lead to orbital angular momentum in the final state of the deuterium and tritium nuclei, Applicant believes this distribution of velocities will be insufficient to diverge the neutron beams to an unusable extent as compared to currently available isotropic neutron sources.

By way of example, a neutron beam generator of the instant invention may be mounted on a vehicle, and the neutron beam scanned back and forth so as to scan the ground in front of the vehicle in order to detect buried explosives while the vehicle is some distance away from the explosives. Here, a neutron generator of the instant invention may be mounted in scanning gimbals in order to scan and point the entire neuron generator, and thus the neutron beam, in desired directions. In this type application, the lack of background noise that otherwise would be produced by isotropic neutron emission would greatly increase detectability of gamma ray signatures indicative of explosives.

In addition to conventional explosives, nuclear materials may also be detected. For example, uranium 235, 238, plutonium and other radioactive materials exhibit strong gamma ray signatures when struck by neutrons.

Other applications include equipment for rapidly scanning containers as they are loaded onto or offloaded from ships or truck carriages, airport and border crossing security systems, or possibly airborne scanning and/or pointing systems for remotely detecting materials in or on the ground. As should be apparent to those skilled in the art, upon development of apparatus that generates at least one relatively tight neutron beam, many other applications will result.

The key technical issue for this invention is the production of neutron beams produced and emitted directly from a target. Directionality of the neutron beams is determined by direction of nuclear spin orientation of deuterium ions in the beam and spin orientation of deuterium and tritium nuclei in the target at the moment of fusion. For instance, deuterons in an ion beam directed to a deuterium or tritium target may be oriented with their spin alignments pointing up, while deuterium or tritium nuclei of the target may be oriented with their spin alignments pointing down (anti-aligned). In this instance, the Bahder et. al. paper incorporated herein by reference predicts generation of two neutron beams, one at +82.85 degrees and the other at −82.85 degrees, each with respect to an axis of the deuteron beam. Thus, it should be possible to directly steer the neutron beams through an arc by synchronously varying direction of spin orientation of both the deuteron beam and target nuclei, keeping the spin axis of both the deuterons and target nuclei parallel. In practice, any sweep angle should be possible by synchronously varying spin angles of the deuterons and target nuclei by a selected amount. It may also be possible to vary direction of spin alignment of one of the deuteron beam and target nuclei in order to sweep the neutron beams in a selected arc.

The physics of nuclear magnetic spin alignment is very well known and practiced every day by the nuclear magnetic resonance imaging (MRI) industry. However, magnetic fields of MRI machines spin align only a very small fraction of hydrogen nuclei in a patient undergoing observation. Also, MRI machines observe spin of normal hydrogen, which has a spin value of ½. Tritium also has a spin of ½, which splits into two magnetic sublevels: $m_I=+½$ and $-½$. Deuterium, on the other hand, has a spin of 1, with magnetic sublevels: $m_I=+1$, 0, and $-1$. As noted, to generate a beam of neutrons, deuterons of an ion beam and deuterium or tritium nuclei of the target must each have their spins fixed at a selected orientation at the moment of fusion.

Production of a highly spin polarized beam of atomic deuterium (Ref. 6) has been performed at a number of nuclear physics facilities for more than 10 years for experimental purposes. For instance, a paper entitled SPIN-EXCHANGE EFFECTS ON TENSOR POLARIZATION OF DEUTERIUM ATOMS (Ref. 7), by H. J. Bulten, Z. L. Zhou, J. F. J. van den Brand, M. Ferro-Luzzi and J. Lang, published in THE AMERICAN PHYSICAL REVIEW, vol. 58, no. 2, pgs. 1146-1151, (August 1998) describes an ion polarimeter diagnostic instrument to measure the tensor polarization of polarized deuterium. In this case, a small amount of polarized deuterium gas was extracted from a polarization cell. The gas was ionized by an electron beam and accelerated to 60 keV and fired into an unpolarized tritium target. An expression for the angle-dependent neutron emission rate is given in Ref. 7 for the case of fusing polarized deuterium with unpolarized tritium absorbed into a titanium disk. However, this paper does not show the case of polarized deuterium being accelerated into a target containing polarized tritium or deuterium nuclei. While this paper does show a slight anisotropy of neutron production, it does not show a strong anisotropy of neutron production due to tritium in the target being unpolarized.

Nuclear spin polarized targets are known (Ref. 8-10). For instance, another paper (Ref. 11) entitled LASER-DRIVEN NUCLEAR POLARIZED HYDROGEN INTERNAL GAS TARGET, by J. Seely et al, published in THE AMERICAN PHYSICAL SOCIETY, A 73, 062714 Pgs1-14, (2006), and which is incorporated herein by reference, describes a polarized hydrogen gas target which is used in scattering experiments. Here, apparatus is disclosed wherein deuterium ions are passed through a rubidium or potassium vapor cell. The electrons associated with the rubidium or potassium vapor are spin polarized by optical pumping with a circularly polarized laser tuned to the n=3 to n=2 transition in the alkali vapor. Potassium or rubidium is chosen because of the relatively high charge exchange cross section with fast deuterons, and the readily available tunable Ti-sapphire lasers or diode lasers with high power at the required wavelength. In this vapor cell, the deuterium ions pick up a spin polarized electron from the rubidium or potassium atoms, and while becoming neutralized, also become spin polarized.

The deuterium ions pick up a spin polarized electron primarily into the n=2 excited state To preserve the polarization state after neutralization, the alkali vapor cell is contained in a magnetic field. This magnetic field preserves the spin polarization state as the deuterium atom decays to the ground state after the charge exchange has occurred. As the spin polarized deuterium atoms emerge from the vapor cell, the atoms enter a second ionizer to allow acceleration and current measurement. The nuclei first pass through a pair of sextupole magnets to separate the spin states according to the Stern-Gerlach principle, passing a single spin state, such as +1. The ions then pass through a sextupole magnet, and their polarization measured.

Applicant proposes that when deuterons are fused with tritium or deuterium nuclei, if the nuclear spins of both the deuterons and target nuclei are fixed in selected spatial orientation just prior to the moment of fusing, then the resulting production of neutrons and alpha particles (for the case of deuterium and tritium fusing) or the resulting protons and tritium nuclei or neutrons and helium 3 (for the case of deuterium fusing with other deuterium nuclei) that these resulting particles will be emitted in a distribution directly from the target with a high degree of anisotropy, which should be on the order of 3:1 or better. It is also believed an anisotropy of at least 10:1 or better is achievable. As noted, it may be possible to adjust directionality of the neutron beam by adjusting spin alignment orientation of either deuterons of the beam, adjusting spin alignment orientation of deuterium or tritium atoms of the target, or perhaps by adjusting both. In other words, a neutron beam produced by the instant invention may be steered by controllably adjusting or varying spin alignment of deuterons of the ion beam or by controllably adjusting or varying spin alignment of deuterium or tritium atoms of the target, or perhaps both.

SUMMARY OF THE INVENTION

A process for producing a beam of neutrons is disclosed. A beam of spin aligned ions is generated, this beam directed into a target including spin aligned nuclei. The resulting collisions between the spin aligned ions of the beam and spin aligned atoms of the target cause a neutron beam to be generated. This beam may then be pointed in any desired direction.

DETAILED DESCRIPTION OF THE DRAWINGS

Figure 1:
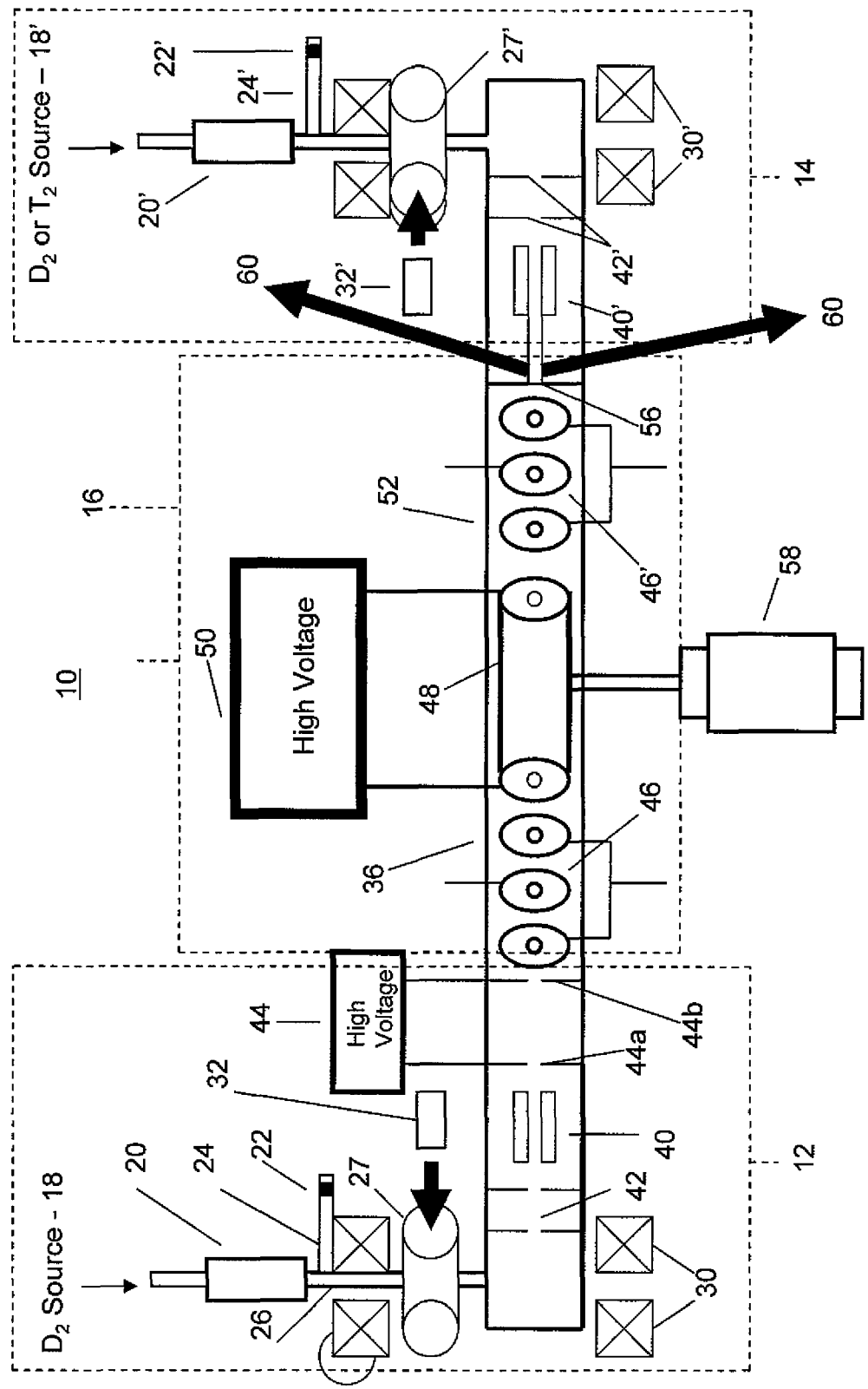
FIG. 1 is a partially schematic, partially block diagram of one embodiment of the invention.

For implementing the instant invention, reference is made to FIG. 1. A neutron beam generator 10 may be constructed having a spin polarized or spin aligned deuterium ion beam generator 12 and a spin polarized or spin aligned target ion generator 14. An ion accelerator 16 serves to accelerate spin polarized deuterium ions produced by generator 12 up to about 100-110 KeV or so. Ion beam generator 12 provides ions for a beam of spin polarized deuterons, and initially comprises a source 18 of deuterium gas that is provided at a very slow rate so as to provide deuterium at a rate of about $10^8$-$10^{14}$ molecules per second. Clearly however, more or less gas may be provided to supply ions for the beam depending on the neutron flux desired. The deuterium diatomic gas from source 18 is provided to an RF dissociater 20, wherein the diatomic gas is broken down into monatomic deuterium by RF radiation of a frequency that may be anywhere from 10 Mhz to 3 Ghz, or so, as should be known by those skilled in the art. Power of this RF radiation may be anywhere from 10-200 watts, depending on a desired ion beam current. A small amount of spin exchange material, such as rubidium or potassium, may be placed in an ampoule 22 or the like connected to tubing 24, in turn connected to tubing 26 that receives the monoatomic deuterium from RF dissociator 20. The spin exchange material is heated to about 200-250 C in order to provide alkali atoms for spin exchange with monatomic deuterium atoms, which are generally constrained within a polarization cell 27 comprising a tubular polarization chamber 28 and one or more magnetic coils 30. Coils 30 generate an electromagnetic field to generally constrain the spin exchange ions within chamber 28 and maintain polarization of the atoms therein A coating known to those skilled in the art, such as DRIFILM, an organosilane or other Teflon-type compound, may be applied to interior walls of chamber 28 to reduce recombination of the monatomic atoms and loss of polarization due to the atoms striking sides of chamber 28. A pumping laser 32, such as a titanium-sapphire laser or a diode laser, provides a laser beam that is passed through a quarter wave plate in order to circularly polarize the laser beam, which is then provided into chamber 28. Laser 32 is tuned to a spectral frequency is tuned to a spectral frequency such that when laser photons impinge on the electron clouds of the spin exchange material atoms, the spin exchange material atoms become spin polarized due to an electron of the material absorbing a photon and being kicked up from a ground state of N=1 to a higher N=3 energy state.

The deuterons from RF disassociator 20 pass into cell 28, where they undergo collisions with the spin polarized atoms of the spin exchange material and pick up a spin value of one of +1, −1 or 0, and become polarized. These polarized deuterons pass into one end 34 of an accelerator tube 36, where the deuterons are pass through a pinhole collimator 42. A central opening of the first plate of collimator 42 may be on the order of 0.01 millimeter to 1 millimeter, and the second plate may have a central opening of 0.1 millimeter to 1 millimeter. The collimated beam of deuterium atoms passes through sextupole magnet 40, which removes one of the spin states +1, −1 and 0, and passes a column of deuterons having a single spin value such as +1 or −1 through an electrical field generated by high voltage power supply 44, which is applied between plates 44a and 44b. Significantly, a central opening in plates 44a, 44b may be on the order of 1-50 microns or so, which draws the deuterium gas through the plates in the form of a tiny high speed jet under the influence of suction drawn by a turbo molecular vacuum pump. The deuterium atoms are ionized as they pass through plates 44a, 44b, giving them a positive charge. After being ionized, the atomic nuclei pass through an electrostatic lens 46, such as an Einzel lens, which focuses the column of atomic nuclei into a tighter beam. This beam is passed to an accelerator 48 powered by a high voltage power supply 50, accelerator 48 and power supply 50 are configured to accelerate the deuteron beam to about 100-110 KeV or so. This higher-energy beam of deuterons passes through another electrostatic lens 52, which again may be an Einzel lens, which refocuses and tightens the 100-110 KeV beam.

The target ion generator 14 is very similar to beam ion generator 12, with like components designated with the same number and a prime (') marking. As such, a supply 18' of deuterium or tritium gas provides a small amount of tritium or deuterium diatomic gas to an RF dissociator 20', which disassociates the diatomic gas into a monatomic gas using a similar frequency as RF disassociator 20. A small amount of a spin exchange material, again which may be potassium or rubidium, is in a heated ampoule or the like 22' connected via tubing 24' to tubing 26', and which provides atoms of the spin exchange material to polarization cell 27'. This spin exchange material is pumped by a circularly polarized laser beam as described for laser 32 in order to spin polarize the spin exchange atoms, which collide with and impart a spin value to deuterium or tritium. As noted, deuterium picks up spin values of +1, −1 and 0, while tritium picks up spin values of +½ and −½. These spin polarized deuterions or tritions are provided to and held in a target chamber 54 of accelerator tube 36, chamber 54 being separated and sealed from the rest of accelerator tube 36 by a thin membrane 56. Membrane 56 may be a sealed carbon fiber membrane, a sealed kevlar-type membrane, or a gold or titanium membrane or a membrane of any material that does not unduly interfere with passage of the 107 KeV deuteron beam therethrough, and which contains the monatomic spin polarized deuterium or tritium within chamber 54. A pinhole collimator 42' and sextupole magnet 40' provide polarized monatomic deuterium or tritium atoms of a single spin state to a target region 41. As there is no net gas flow through pinhole collimator 42' and sextupole magnet 40', deuterium or tritium gas flows into target region 41 as it is used up in collisions with the accelerated beam of deuterium atoms passing through membrane 56. The resulting collisions between spin aligned deuterons of the beam passing through membrane 56 and spin aligned deuterium or tritium gas in target chamber 54 produces at least one neutron beam from chamber 54. As noted above, for the case of deuterium or tritium, it is believed two neutron beams may be produced, and which exit chamber 54 as shown at +82.85 degrees and −82.85 degrees with respect to the polarized deuterium ion beam.

The apparatus of FIG. 1 may be constructed of glass, such as Pyrex™ or other heat-resistant glass, or other materials as should be apparent to those skilled in the art. The other components, such as the diode laser, electrostatic lenses and electrical coils would be obtained via commercial sources or fabricated in accordance with known techniques.

In operation, deuterium diatomic gas is fed from source 18 into RF disaociator 20, converting the diatomic deuterium into monatomic deuterium. Spin exchange material 22 is heated, providing spin exchange atoms along with the deuterium atoms to polarization chamber 28, where the spin exchange atoms are pumped by circularly polarized laser light, and impart polarization to the deuterium atoms. The deuterium atoms pass into chamber 34 and through pinhole collimator 42, where they encounter sextupole magnet 40. Magnet 40 serves as a filter to pass atoms of a single spin state to plates 44a and 44b of high voltage ionizer 44. As noted, plates 44a and 44b have extremely small openings therein so that only tiny amounts of gas flow through the openings. As such, gas pressure on the left side of plates 44a, 44b may be relatively high, on the order of 14 PSI or so, while to the right of plates 44a, 44b turbomolecular pump 60 is constantly operated to maintain a relative vacuum of about $10^{-1}$ to $10^{-6}$ Torr. This relative vacuum is felt between plates 44a, 44b and membrane 56, and reduces collisions between atoms of the ion beam and other extraneous atoms within the neutron beam generating tube. As stated, the vacuum draws out the spin polarized atomic deuterium gas in an extremely fine jet, where an Einzel lens 46 compacts the ionized jet into a beam of ions, and provides the ions to an electrostatic accelerator that accelerates the beam to an energy level between 100 and 10 MeV. After being accelerated, the beam passes through another Einzel lens, again compacting the beam, after which the beam passes through membrane 56.

Target ion generator 14 functions the same as ion beam generator 12 as described above, also maintaining a pressure of about 14 PSI therein. Here, the spin polarized atoms of deuterium or tritium are provided to a pinhole collimator 42' and a subsequent sextupole magnet 40'. Magnet 40' is in turn connected to a tubular target region wherein 100-110 KeV deuterium ions passing through membrane 56 impinge on spin polarized deuterium or tritium atoms, the resulting radioactive decay emitting neutrons at +82.85 degrees and −82.85 degrees as described above. Also as noted, the resulting beam of neutrons may be pointed, aimed or scanned as desired by physically moving the entire apparatus or possibly by manipulating the spin polarized ions and/or spin polarized atoms.

Figure 2:
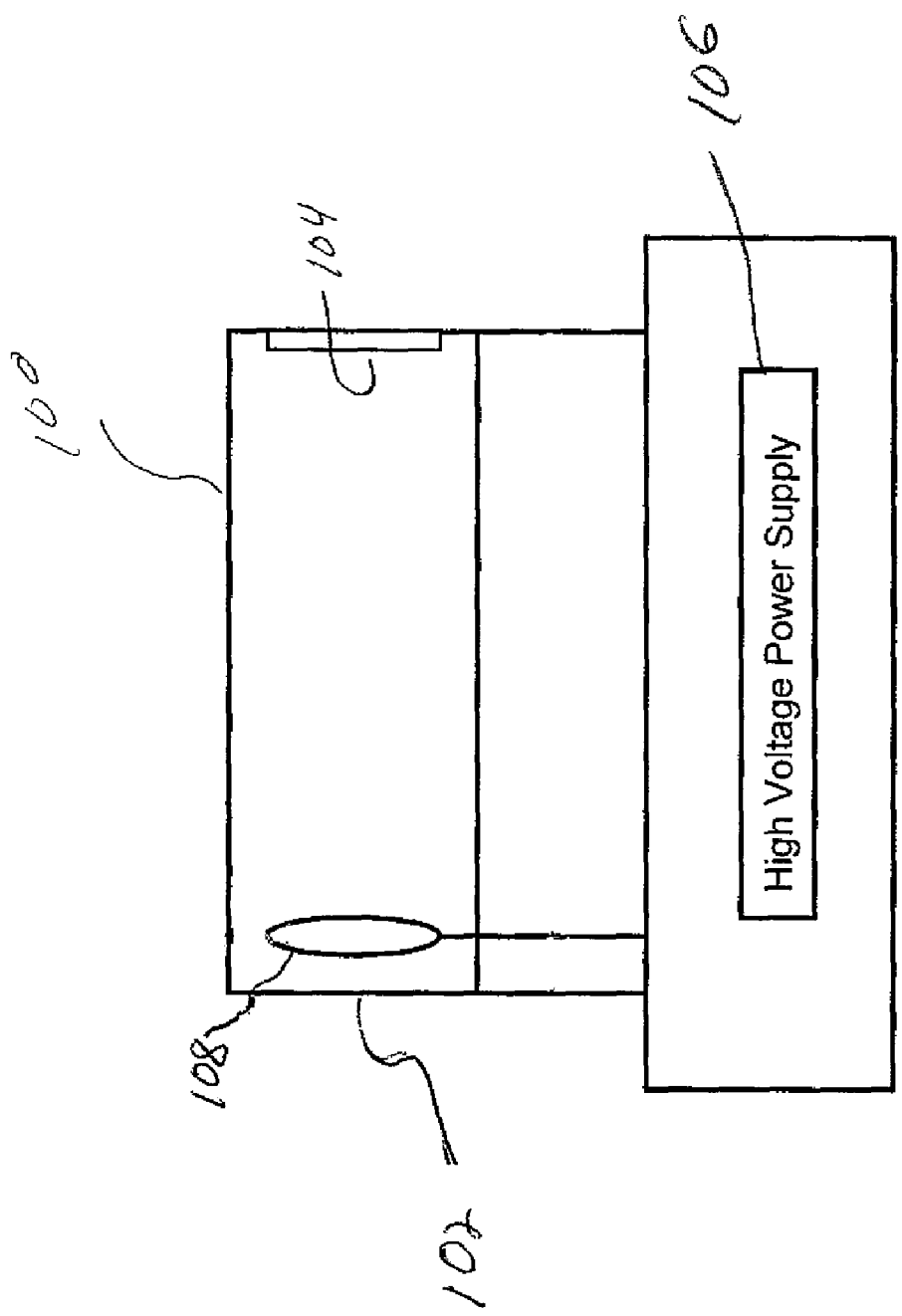
FIG. 2 is a partially schematic, partial block diagram of another embodiment of the invention.

FIG. 2 illustrates another embodiment of the present disclosure of a neutron beam generator similar to like existing isotropic neutron beam generators wherein a sealed glass envelope 100 contains a high voltage anode 102 and a high voltage cathode 104. A high voltage power supply 106 applies a high voltage potential of between 100 and 110 KeV between the anode and cathode in order to supply an accelerating potential to deuterium ions. In this embodiment, spin polarized deuterium gas is sealed within enclosure 100, and spin polarized tritium or deuterium is infused into the titanium target. The anode grid 108 simply ionizes deuterium atoms, and accelerates them into the cathode, where they undergo collisions with tritium atoms and form the described neutron beams.

Figure 3:
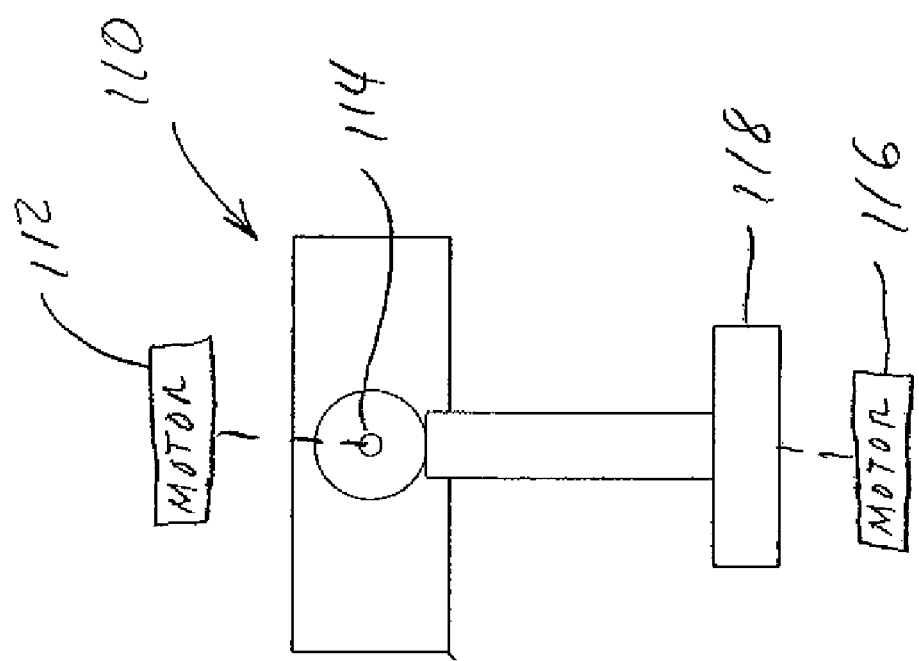
FIG. 3 is a diagrammatic illustration of a neutron tube of the instant invention in a gimbal apparatus for pointing and/or scanning one or more neutron beams in a disered direction.

FIG. 3 diagrammatically illustrates a neutron beam generator 110 mounted so as to be translated simultaneously in vertical and horizontal directions, pointing or scanning the beams in any desired directions. Here, a motor 112 coupled to a horizontal shaft 114 controllably provides translation in vertical directions, and a motor 116 coupled to a swiveling base 118 rotates neutron beam generator 110 about an axis normal to neutron beam generator 110. As noted, such an apparatus may be mounted to a vehicle, and moved in a scanning manner similar to radar apparatus in order to swing at least one neutron beam in any direction with respect to the vehicle.

Having thus described my invention and the manner of its use, it should be apparent to those skilled in the various arts to which the invention pertains that incidental changes may be made thereto that fairly fall within the scope of the following appended claims, wherein I claim:

The invention claimed is:

1. A process comprising:
   generating a beam of spin aligned ions,
   providing a target comprising spin aligned nuclei,
   directing said beam of spin aligned ions into said spin aligned nuclei of said target, generating a neutron beam, and,
   pointing a resulting neutron beam in a direction determined by the nuclear spin orientation of said spin aligned ions and said spin aligned nuclei of said target.

2. A process comprising:
   imposing a first selected nuclear spin state on atoms of monatomic deuterium gas,
   ionizing said atoms of deuterium gas having said first nuclear spin state,
   providing a target comprising at least one of deuterium nuclei or tritium nuclei,
   imposing a second selected spin state on said deuterium nuclei or tritium nuclei,
   accelerating ionized said atoms of deuterium gas having said first nuclear spin state into said nuclei of deuterium or tritium having said second selected spin state, and,
   pointing a neutron beam emitted by collisions between said ionized and spin aligned said deuterium atoms and said spin aligned nuclei of deuterium and tritium in a direction determined by the nuclear spin orientation of said ionized and spin aligned deuterium atoms and said spin aligned nuclei of deuterium and tritium.

3. A process as set forth in claim 2 wherein said imposing a first selected spin state and said second selected spin state further comprises aligning one of said atoms of deuterium and said nuclei of deuterium and tritium in a first selected orientation and aligning the other of said atoms of deuterium and said nuclei of deuterium and tritium in a second selected orientation.

4. A process as set forth in claim 2 wherein said imposing a first selected spin state and said second selected spin state further comprises aligning one of said atoms of deuterium and said nuclei of deuterium and tritium in a selected orientation and aligning the other of said atoms of deuterium and said nuclei of deuterium and tritium in the same spin state orientation.

5. A process as set forth in claim 2 further comprising holding a said first spin alignment of said atoms of deuterium and a said second spin alignment of said nuclei of deuterium and tritium the same, and moving apparatus producing said neutron beam in order to vary pointing of said neutron beam.

6. A process as set forth in claim 5 further comprising mounting said apparatus in translating apparatus in order to vary pointing of said neutron beam.

7. A process comprising:
   generating a beam of ionized deuterium atoms having a first selected spin alignment,
   directing said beam of spin aligned, ionized deuterium atoms into at least one of deuterium nuclei and tritium nuclei having a second selected spin alignment, said first selected spin alignment and said second selected spin alignment selected to produce a neutron beam, and,
   pointing said neutron beam to a region or area to be examined, as determined by the nuclear spin orientation of said spin aligned ionized deuterium atoms and said nuclei having said second selected spin alignment.

8. A process as set forth in claim 7 further comprising maintaining the same relative spin alignment between said beam of ionized, spin aligned deuterium atoms and said at least one of said spin aligned deuterium and tritium atoms in order to determine a pointing direction of said neutron beam.

9. A process as set forth in claim further comprising adjusting orientation of an apparatus containing said beam of ionized deuterium atoms having said first selected spin alignment and said at least one of deuterium nuclei and tritium nuclei having a second selected spin alignment in order to determine a direction of said neutron beam.

\* \* \* \* \*